United States Patent
Edmondson et al.

(10) Patent No.: US 8,427,495 B1
(45) Date of Patent: *Apr. 23, 2013

(54) COALESCING TO AVOID READ-MODIFY-WRITE DURING COMPRESSED DATA OPERATIONS

(75) Inventors: John H. Edmondson, Arlington, MA (US); Robert A. Alfieri, Chapel Hill, NC (US); Michael F. Harris, Raleigh, NC (US); Steven E. Molnar, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1285 days.

This patent is subject to a terminal disclaimer.

(21) Appl. No.: 11/954,722

(22) Filed: Dec. 12, 2007

Related U.S. Application Data

(63) Continuation-in-part of application No. 11/555,639, filed on Nov. 1, 2006.

(51) Int. Cl.
G06F 12/02 (2006.01)
(52) U.S. Cl.
USPC .......................................... 345/543; 345/555
(58) Field of Classification Search .................. 345/543, 345/555
See application file for complete search history.

(56) References Cited

U.S. PATENT DOCUMENTS

| | | | |
|---|---|---|---|
| 5,852,443 A | 12/1998 | Kenworthy | |
| 6,104,416 A | 8/2000 | McGuinness | |
| 6,580,427 B1 | 6/2003 | Orenstein et al. | |
| 6,912,645 B2 | 6/2005 | Donward et al. | |
| 6,961,057 B1 * | 11/2005 | Van Dyke et al. | 345/422 |
| 7,030,878 B2 | 4/2006 | Xu et al. | |
| 7,277,098 B2 | 10/2007 | Xu et al. | |
| 7,286,134 B1 | 10/2007 | Van Dyke et al. | |
| 7,505,036 B1 | 3/2009 | Baldwin | |
| 7,657,679 B2 | 2/2010 | Chen et al. | |
| 2003/0018878 A1 | 1/2003 | Donward et al. | |
| 2003/0079919 A1 | 5/2003 | Hochmuth et al. | |
| 2003/0234749 A1 | 12/2003 | Marks et al. | |
| 2005/0018917 A1 | 1/2005 | Brothers | |
| 2005/0206647 A1 | 9/2005 | Xu et al. | |
| 2006/0170693 A1 | 8/2006 | Bethune et al. | |

OTHER PUBLICATIONS

Office Action, U.S. Appl. No. 12/649,204 dated Jul. 22, 2010.
Office Action, U.S. Appl. No. 11/555,639, dated Dec. 24, 2009.

* cited by examiner

*Primary Examiner* — Maurice L McDowell, Jr.
(74) *Attorney, Agent, or Firm* — Patterson & Sheridan, LLP

(57) ABSTRACT

Write operations to a unit of compressible memory, known as a compression tile, are examined to see if data blocks to be written completely cover a single compression tile. If the data blocks completely cover a single compression tile, the write operations are coalesced into a single write operation and the single compression tile is overwritten with the data blocks. Coalescing multiple write operations into a single write operation improves performance, because it avoids the read-modify-write operations that would otherwise be needed.

20 Claims, 2 Drawing Sheets

COALESCING TO AVOID READ-MODIFY-WRITE DURING COMPRESSED DATA OPERATIONS

CROSS-REFERENCE TO RELATED APPLICATIONS

This application is a continuation-in-part of co-pending U.S. patent application Ser. No. 11/555,639, filed Nov. 1, 2006, which is herein incorporated by reference.

BACKGROUND OF THE INVENTION

1. Field of the Invention

Embodiments of the present invention relate generally to compressed data operations during graphics processing and more specifically to a system and method for avoiding read-modify-write performance penalties during compressed data operations.

2. Description of the Related Art

In graphics processing, compressed data is often employed for efficient memory usage. For example, the frame buffer of a graphics processing unit ("GPU") typically stores graphics data in compressed form to realize storage efficiencies. The unit of memory for data stored in the frame buffer is called a "tile" or a "compression tile." Compression tiles may store color data or depth data for a fixed number of pixels in compressed or uncompressed form.

FIG. 1 illustrates a GPU 102 including a rendering pipeline, known as a raster operations pipeline ("ROP") 104. ROP 104 is configured to handle data transfer operations to a frame buffer 110, which is normally implemented as a DRAM, through a frame buffer interface 105. The frame buffer 110 receives the data in blocks from the frame buffer interface 105 and stores it in the form of tiles.

Under some circumstances, the size of the blocks transferred by ROP 104 or another frame-buffer client may be smaller than the compression tile size. In these cases, storing a block in the frame buffer 110 involves identifying a tile that corresponds to the block and updating that tile to include data from the block, while leaving all remaining data in the tile unchanged. For an uncompressed tile, modifying the tile in-memory can be done because the uncompressed format of the tile allows modifying a portion of the tile without disturbing the contents of the remainder of the tile. However, as is commonly known, modifying compressed tiles in-memory is difficult because the dependent relationship among data stored in compressed format causes changes to one portion of the tile to disturb the remainder of the tile. Thus, for a compressed tile, updating the tile requires the frame buffer interface 105 to read the contents of the tile from the frame buffer 110, decompress the tile contents, modify the uncompressed tile contents with the block of data to be written, and write back the uncompressed, modified tile to the frame buffer 110. This process is expensive because modern DRAMs are not able to change from read to write mode quickly and because the operation causes the frame buffer 110 to de-pipeline, i.e., stop streaming accesses.

SUMMARY OF THE INVENTION

The present invention provides an improved method and system for handling compressed data. According to embodiments of the present invention, write operations to a unit of compressible memory, known as a compression tile, are examined to see if data blocks to be written completely cover a single compression tile. If the data blocks completely cover a single compression tile, the write operations are coalesced into a single write operation and the single compression tile is overwritten with the data blocks. Coalescing multiple write operations into a single write operation improves performance, because it avoids the read-modify-write operations that would otherwise be needed.

A processing unit according to an embodiment of the present invention includes a frame buffer having a plurality of compression tiles and a rendering pipeline that transfers a sequence of data blocks to be stored in the frame buffer. The data blocks may comprise depth data for a plurality of pixels or color data for a plurality of pixels. The size of the data blocks is less than the size of the compression tiles, so that any single data block write operation on a compression tile requires the data currently stored in the compression tile to be read, decompressed if it was compressed, and modified using the single data block. The modified data is then written into the compression tile. To avoid such read-modify-write operations, the frame buffer interface of the processing unit, according to an embodiment of the present invention, is configured to receive the sequence of data blocks from the rendering pipeline and determine if any multiple number of data blocks (2 or more) completely cover a single compression tile. If this condition is true, the multiple number of data blocks covering a single compression tile are combined and stored in the single compression tile as part of a single, coalesced write operation to the frame buffer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
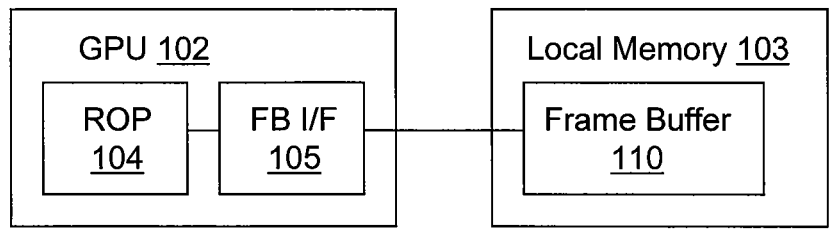
FIG. 1 illustrates a conventional GPU.
Figure 2:
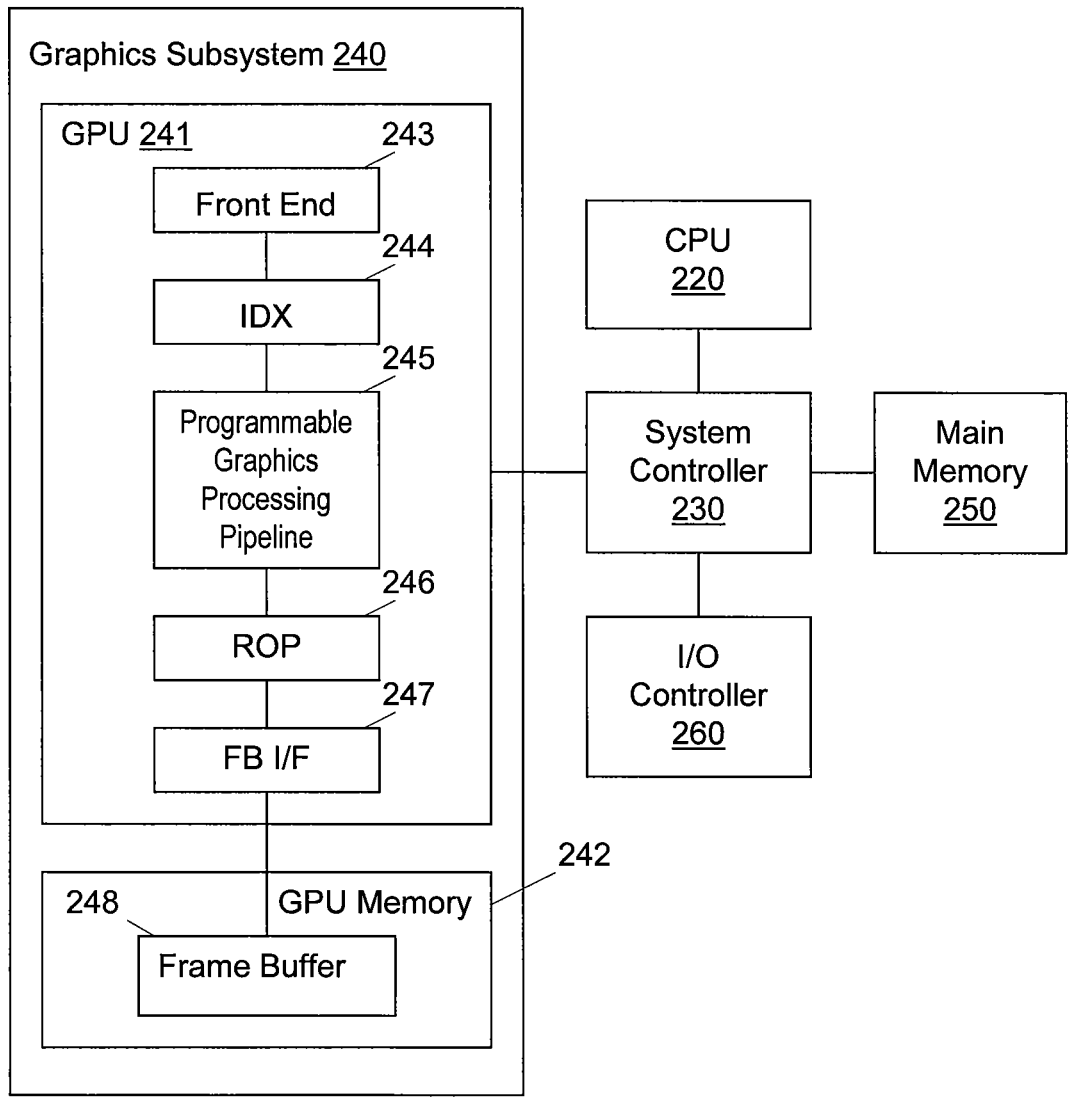
FIG. 2 illustrates a computing device in which embodiments of the present invention can be practiced.

FIG. 2 illustrates a computing device in which embodiments of the present invention can be practiced. The computing device 210 includes a central processing unit (CPU) 220, a system controller hub 230 (sometimes referred to as a "northbridge"), a graphics subsystem 240, a main memory 250, and an input/output (I/O) controller hub 260 (sometimes referred to as a "southbridge") which is interfaced with a plurality of I/O devices (not shown), such as a network interface device, disk drives, USB devices, etc.

The graphics subsystem 240 includes a GPU 241 and a GPU memory 242. GPU 241 includes, among other components, front end 243 that receives commands from the CPU 220 through the system controller hub 230. Front end 243 interprets and formats the commands and outputs the formatted commands and data to an IDX (Index Processor) 244. Some of the formatted commands are used by programmable graphics processing pipeline 245 to initiate processing of data by providing the location of program instructions or graphics data stored in memory, which may be GPU memory 242, main memory 250, or both. Results of programmable graphics processing pipeline 245 are passed to a ROP 246, which performs raster operations, such as stencil, z test, and the like, and saves the results or the samples output by programmable graphics processing pipeline 245 in a render target, e.g., a frame buffer 248, through a frame buffer interface 247.

ROP 246 is configured to handle data transfer operations to the frame buffer 248, which is implemented as a DRAM, through the frame buffer interface 247. The frame buffer interface 247 receives the data in fixed size blocks from ROP 246, combines the data blocks to form combined blocks, and stores the combined blocks as full compression tiles within the frame buffer 248. In the embodiment of the present invention illustrated herein, when performing certain blit operations, ROP 246 writes data in blocks of 128 bytes but the corresponding compression tile size is 256 bytes. Thus, one compression tile includes two data blocks. In other embodiments of the present invention, the compression tile size can be any integer multiple of the data block size.

The frame buffer interface 247 is configured to examine the blocks of data received from ROP 246 and control the timing of the writes to the tiles in the frame buffer 248. If two blocks of data that are sequentially received are to be written to two halves of the same tile, the two write operations are coalesced into one write operation on the tile. The write operation includes combining the two data blocks and then writing the combined block onto the tile. In the preferred embodiment, the combined blocks are written onto the tile in uncompressed form. In an alternative embodiment, the combined blocks may be compressed and written onto the tile in compressed form. The correct result is ensured to be written onto the tile using this method because the entire tile is being overwritten. With this method, a copy operation such as a blit operation, which transfers data from a source to a destination can be efficiently carried out, because the write data stream will consist of a sequence of data block pairs, wherein each data block pair has the same write destination tile. As a result, the frame buffer 248 can continue to stream and can avoid de-pipelining to accommodate read-modify-writes.

Figure 3:
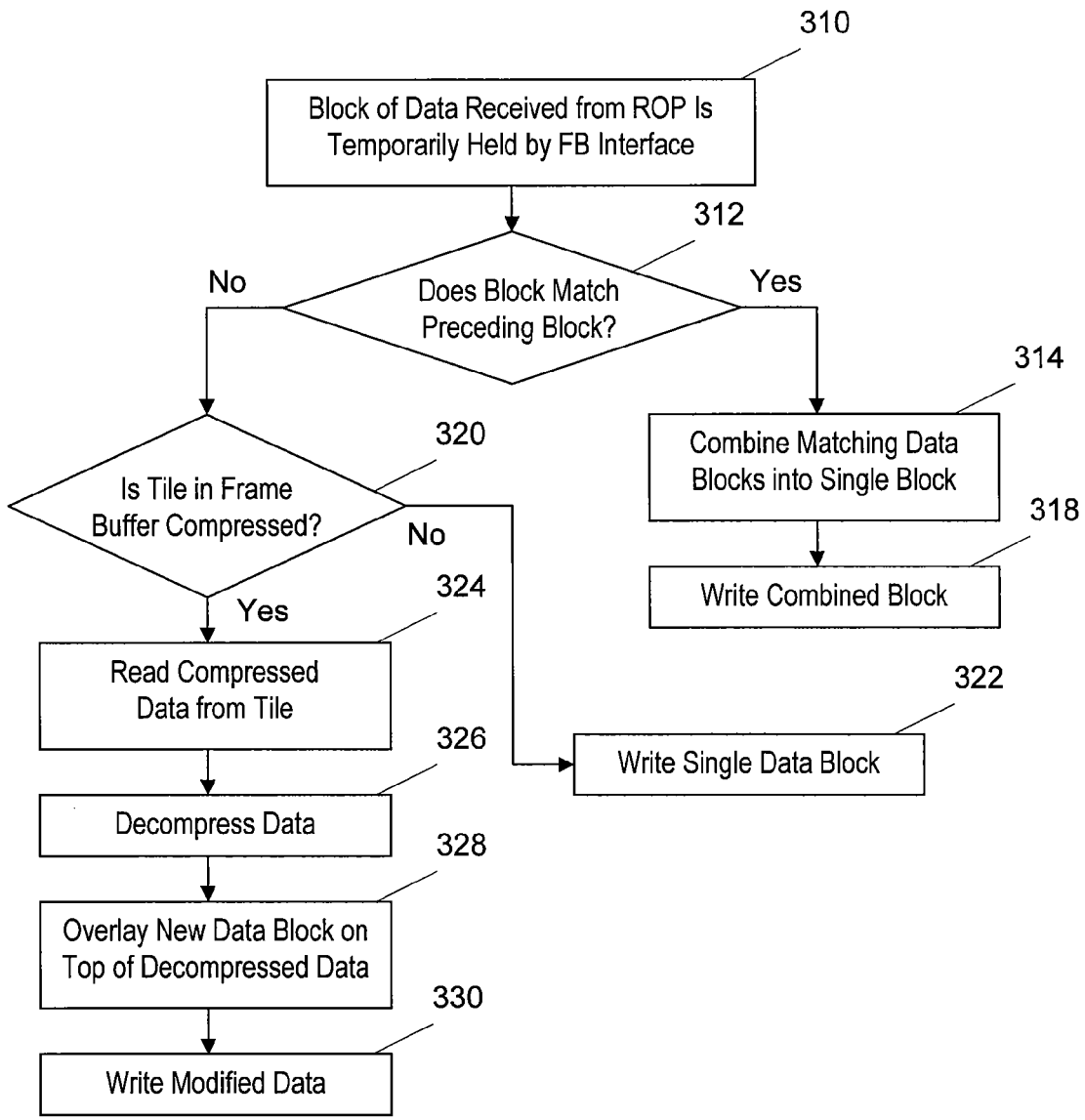
FIG. 3 is a flow diagram that illustrates the steps carried out during a write operation by a frame buffer interface shown in FIG. 2.

FIG. 3 is a flow diagram that illustrates the steps carried out by the frame buffer interface 247 for each block of data received from ROP 246 during a write operation. In step 310, each block of data is temporarily held in the frame buffer interface 247 for a fixed number of cycles, e.g., 100 cycles. The block of data is then examined for a match with a preceding block of data, i.e., to see if it and the preceding block of data are two halves of the same tile (step 312). If they are, the matching data blocks are combined into a single data block (step 314). In step 318, the combined data block is written into the tile.

If no match is found in step 312 within the fixed number of cycles, flow proceeds to step 320, where it is determined whether the tile being written to is compressed or not. If it is not compressed, the new block of data is written into the tile (step 322). If it is compressed, the compressed data is read from the frame buffer 248 (step 324) and decompressed (step 326). Then, in step 328, the new block of data is overlaid on top of the decompressed data. In step 330, the modified decompressed data is written into the tile.

In an alternative embodiment, end-of-transfer tokens are included at the end of a data transfer. In such embodiment, the decision block in step 312 is exited when the end-of-transfer token is received, and flow proceeds to either step 314 or step 320 upon receipt of the end-of-transfer token.

In a further embodiment, the frame buffer interface 247 holds data blocks for more than one compression tile. In such an embodiment, as a data block arrives, the frame buffer interface 247 determines if it corresponds to any of the pending compression tiles. If it is and it completes a compression tile, this data block and one or more other data blocks that cover the compression tile are written to the compression tile in a single write operation. If a compression tile is not completed within a predetermined time period, a write operation to this compression tile is performed as described in steps 320, 322, 324, 326, 328, and 330, above. Thus, in this embodiment, data blocks need not arrive in a strict sequence in order to be combined.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

We claim:

1. A method for writing a sequence of data blocks, wherein the size of the data blocks is smaller than the size of data stored in a unit of compressible memory, said method comprising the steps of:
   receiving a first data block to be written;
   temporarily holding the first data block in a buffer for a fixed number of clock cycles;
   subsequently receiving one or more additional data blocks to be written;
   temporarily holding the one or more additional data blocks in the buffer for the fixed number of clock cycles;
   determining if the received data blocks are sufficient to completely cover the same unit of compressible memory; and
   if the received data blocks are not sufficient to completely cover the same unit of compressible memory, reading the data in the same unit of compressible memory to which the first data block is to be written, decompressing the data, modifying the decompressed data with the first data block, and writing the modified data into the same unit of compressible memory; or
   if the received data blocks are sufficient to completely cover the same unit of compressible memory, combining the first data block and the one or more additional data blocks into a single coalesced write operation to the same unit of compressible memory without first reading the data in the same unit of compressible memory.

2. The method according to claim 1, wherein the single write operation includes the step of writing the first data block and the one or more additional data blocks into the same unit of compressible memory.

3. The method according to claim 1, further comprising the step of outputting the sequence of data blocks from a unit within a graphics processing unit, wherein the data blocks comprise depth data for a plurality of pixels.

4. The method according to claim 1, further comprising the step of outputting the sequence of data blocks from a unit within a graphics processing unit, wherein the data blocks comprise color data for a plurality of pixels.

5. The method according to claim 1, wherein the sequence of data blocks are generated by a ROP unit that is configured to perform raster operations.

6. The method according to claim 1, wherein the step of determining is carried out until an end-of-transfer token is received.

7. The method according to claim 1, wherein the additional data blocks that are received subsequent to the first data block include at least a second data block and a third data block, the second data block being received prior to the third data block, and wherein the received data blocks that are sufficient to completely cover the same unit of compressible memory does not include the second data block.

8. The method according to claim 7, wherein the second data block and one or more of the additional data blocks completely cover a unit of compressible memory that is different from the unit of compressible memory corresponding to the first data block.

9. The method according to claim 1, wherein the first data block and the one or more additional data blocks are held for a predetermined time period before determining if the received data blocks are sufficient to completely cover the same unit of compressible memory.

10. In a graphics processing unit having a frame buffer, a frame buffer interface, and a raster operations pipeline, a method for writing output data into a unit of compressible memory stored in the frame buffer using the raster operations pipeline and the frame buffer interface, said method comprising the steps of:

transmitting first output data to the frame buffer interface using the raster operations pipeline;

receiving the first output data at the frame buffer interface;

temporarily storing the first output data at the frame buffer interface for a fixed number of clock cycles;

transmitting one or more additional output data to the frame buffer interface using the raster operations pipeline;

receiving the one or more additional output data at the frame buffer interface;

temporarily storing the one or more additional data blocks at the frame buffer interface for the fixed number of clock cycles;

determining if the received data blocks are sufficient to completely cover the same unit of compressible memory; and if the received output data are not sufficient to completely cover the same unit of compressible memory, reading the data in the unit of compressible memory to which the first output data is to be written, decompressing the data, modifying the decompressed data with the first output data, and writing the modified data into said unit of compressible memory; or if the received output data are sufficient to completely cover the same unit of compressible memory, combining the first output data and the one or more additional output data to generate a single coalesced write operation, and writing the combined output data into the same unit of compressible memory without first reading the data in the same unit of compressible memory.

11. The method according to claim 10, wherein the combined data is written to the unit of compressible memory in compressed form.

12. The method according to claim 10, wherein the combined data is written to the unit of compressible memory in uncompressed form.

13. The method according to claim 10, wherein the first output data and the one or more additional data blocks are stored for a predetermined time period before determining if the received data blocks are sufficient to completely cover the same unit of compressible memory.

14. A processing unit comprising:

a frame buffer storing a plurality of compression tiles;

a frame buffer interface coupled to the frame buffer for controlling reads from and writes into the frame buffer; and a rendering pipeline for transferring a sequence of data blocks to be stored in the frame buffer, wherein the size of the data blocks is less than the size of the compression tiles, wherein the frame buffer interface is configured to: (i) receive the sequence of data blocks from the rendering pipeline and determine that multiple number of data blocks correspond to a single compression tile; (ii) temporarily store each data block in the sequence of data blocks for a fixed number of clock cycles; (iii) determine that the multiple number of data blocks are sufficient to completely cover a single compression tile; and (iv) combine the multiple number of data blocks into a single coalesced write operation to the single compression tile without first reading data in the single compression tile.

15. The processing unit according to claim 14, wherein the frame buffer interface is configured to carry out a read-modify-write operation on the single compression tile if the frame buffer has not received data blocks that are sufficient to completely cover the single compression tile within a predetermined time period.

16. The processing unit according to claim 14, wherein the frame buffer interface is configured to carry out a read-modify-write operation on the single compression tile if the frame buffer has not received data blocks that are sufficient to completely cover the single compression tile when an end-of-transfer token is received.

17. The processing unit according to claim 14, wherein the frame buffer interface is further configured to combine the multiple number of data blocks corresponding to a single compression tile and store the combined data blocks in the single compression tile in compressed form.

18. The processing unit according to claim 14, wherein the data blocks comprise depth data for a plurality of pixels.

19. The processing unit according to claim 14, wherein the data blocks comprise color data for a plurality of pixels.

20. The processing unit according to claim 14, wherein each data block in the sequence of data blocks are stored for a predetermined time period before determining if the received data blocks are sufficient to completely cover the single compression tile.

* * * * *